United States Patent
Kodama et al.

(10) Patent No.: US 10,112,566 B2
(45) Date of Patent: Oct. 30, 2018

(54) COLLISION PREVENTION SYSTEM

(71) Applicant: The Yokohama Rubber Co., LTD., Minato-ku, Tokyo (JP)

(72) Inventors: Yuji Kodama, Hiratsuka (JP); Hiroshi Saegusa, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/748,128

(22) PCT Filed: Jul. 15, 2016

(86) PCT No.: PCT/JP2016/071041
§ 371 (c)(1),
(2) Date: Jan. 26, 2018

(87) PCT Pub. No.: WO2017/018254
PCT Pub. Date: Feb. 2, 2017

(65) Prior Publication Data
US 2018/0222424 A1     Aug. 9, 2018

(30) Foreign Application Priority Data

Jul. 29, 2015   (JP) .................................. 2015-149671

(51) Int. Cl.
*B60Q 1/00*     (2006.01)
*B60R 21/0134*  (2006.01)
(Continued)

(52) U.S. Cl.
CPC ... *B60R 21/0134* (2013.01); *B60W 30/18163* (2013.01); *B60W 40/105* (2013.01);
(Continued)

(58) Field of Classification Search
CPC .......... B60R 21/0134; B60R 2300/804; G06K 9/00798; B60W 2550/10
(Continued)

(56) References Cited

U.S. PATENT DOCUMENTS 7,057,501 B1 *  6/2006  Davis ...................... B60Q 1/46
                                                        340/435
7,388,477 B1 *  6/2008  Manning ................ B60Q 1/447
                                                       340/426.32
(Continued)

FOREIGN PATENT DOCUMENTS

JP   H04-054600      2/1992
JP   2008-158969     7/2008
(Continued)

OTHER PUBLICATIONS

International Search Report for International Application No. PCT/JP2016/071041 dated Sep. 20, 2016, 2 pages, Japan.

*Primary Examiner* — Eric M Blount
(74) *Attorney, Agent, or Firm* — Thrope North & Western

(57) ABSTRACT

In a collision prevention system, a control device defines a collision danger level X such that larger values indicate increased possibility of a following vehicle colliding into a host vehicle due to behavior of the host vehicle, and defines a proximity Pr such that larger values indicate shorter inter-vehicle distance or greater relative velocity between the host vehicle and the following vehicle. When a change in amount $\Delta X/\Delta t$ of the collision danger level X and a threshold value Kxa have a relationship $Kxa \leq \Delta X/\Delta t$, the control device changes a first threshold value Kpr of the proximity Pr to a second threshold value Kpr' lower than the first threshold value Kpr, and actuates a warning device when the collision danger level X and the threshold value Kx have a relationship $Kx \leq X$ and the proximity Pr and the second threshold value Kpr' have a relationship $Kpr' \leq Pr$.

18 Claims, 8 Drawing Sheets

(51) Int. Cl.
*B60W 30/18* (2012.01)
*B60W 40/105* (2012.01)
*G08G 1/16* (2006.01)
*G06K 9/00* (2006.01)

(52) U.S. Cl.
CPC ......... *G06K 9/00798* (2013.01); *G08G 1/166* (2013.01); *B60R 2300/804* (2013.01); *B60W 2550/10* (2013.01); *B60Y 2300/18166* (2013.01)

(58) Field of Classification Search
USPC ...................................... 340/435, 436, 425.5
See application file for complete search history.

(56) References Cited

U.S. PATENT DOCUMENTS

| | | | |
|---|---|---|---|
| 7,493,217 B2* | 2/2009 | Lo | ............................ B60Q 1/34 340/435 |
| 8,941,510 B2* | 1/2015 | Burnison | ................ B60Q 5/006 340/425.5 |
| 2007/0152803 A1* | 7/2007 | Huang | .................... B60Q 1/525 340/435 |
| 2009/0189754 A1* | 7/2009 | Hochrein | ......... G08G 1/096791 340/436 |
| 2012/0262284 A1* | 10/2012 | Irrgang | ............. B60W 30/0956 340/435 |
| 2014/0009275 A1* | 1/2014 | Bowers | .................... B60Q 1/00 340/436 |
| 2016/0005317 A1* | 1/2016 | Nielsen | .................. B60Q 9/008 340/435 |

FOREIGN PATENT DOCUMENTS

| | | |
|---|---|---|
| JP | 2009-090718 | 4/2009 |
| JP | 2011-255863 | 12/2011 |
| WO | WO 2014/192368 | 12/2014 |

\* cited by examiner

HIGH COLLISION DANGER LEVEL X, SMALL CHANGE AMOUNT ΔX/Δt
APPROPRIATE PROXIMITY Pr, THUS NO WARNING

HIGH COLLISION DANGER LEVEL X, SMALL CHANGE AMOUNT ΔX/Δt
PROXIMITY PR INCREASES, WARNING ISSUED

LOW COLLISION DANGER LEVEL X, SMALL CHANGE AMOUNT ΔX/Δt
PROXIMITY Pr LESS THAN THRESHOLD VALUE, THUS NO WARNING

HIGH COLLISION DANGER LEVEL X, LARGE CHANGE AMOUNT ΔX/Δt
WARNING ISSUED AT EARLY STAGE WITH RELATIVELY LOW PROXIMITY Pr

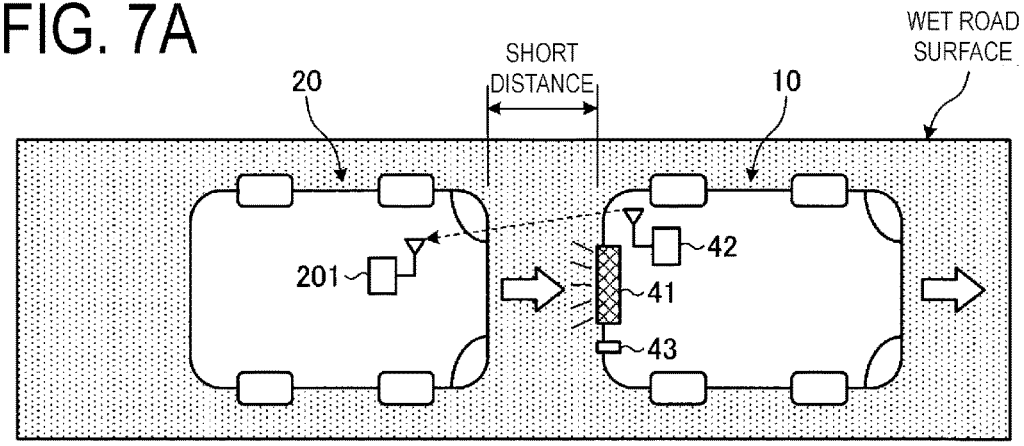
ΔX/Δt < Kxa, Kx ≤ X AND Kpr ≤ Pr (HIGH LEVEL WARNING)
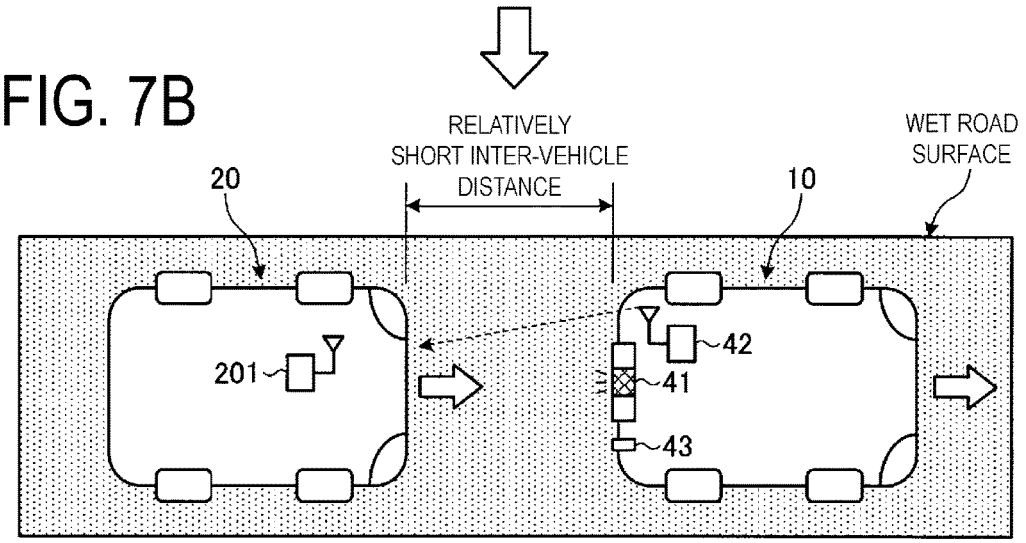
Kxa ≤ ΔX/Δt, Kx ≤ X AND Kpr' ≤ Pr (LOW LEVEL WARNING)

COLLISION PREVENTION SYSTEM

TECHNICAL FIELD

This technology relates to a collision prevention system and particularly relates to a collision prevention system that prevents a collision of a following vehicle into a host vehicle.

BACKGROUND ART

In collision prevention systems in the related art, when the inter-vehicle distance between a host vehicle and a following vehicle is short or when a following vehicle rapidly approaches a host vehicle, a warning is issued from the host vehicle directed at the following vehicle to gain the attention of the driver of the following vehicle. This prompts the driver of the following vehicle to take a suitable action such as ensuring a sufficient inter-vehicle distance to the host vehicle, and prevents a collision of the following vehicle to the host vehicle before it happens. In the related art of such collision prevention systems, the technologies described in Japan Unexamined Patent Application Publication Nos. 04-54600, 2009-90718, and 2011-255863 are known.

SUMMARY

This technology provides a collision prevention system that prevents a collision of a following vehicle into a host vehicle.

A collision prevention system according to an embodiment of the technology is a collision prevention system for preventing a collision of a following vehicle into a host vehicle, the collision prevention system including:

a sensor unit configured to acquire predetermined information that affects behavior of the host vehicle;

a warning device configured to issue a warning toward the following vehicle; and a control device configured to control an operation of the warning device;

the control device defining a collision danger level X such that a larger value indicates an increased possibility of the following vehicle colliding into the host vehicle due to the behavior of the host vehicle, and defining a proximity Pr such that a larger value indicates a shorter inter-vehicle distance or indicates a greater relative velocity between the host vehicle and the following vehicle;

calculating the collision danger level X, a change amount $\Delta X/\Delta t$ of the collision danger level X, and the proximity Pr, based on an output signal from the sensor unit;

when the change amount $\Delta X/\Delta t$ of the collision danger level X and a predetermined threshold value Kxa have a relationship $\Delta X/\Delta t \leq Kxa$, the control device actuating the warning device under conditions that the collision danger level X and a predetermined threshold value Kx have a relationship $Kx \leq X$ and the proximity Pr and a first threshold value Kpr have a relationship $Kpr \leq Pr$; and when the change amount $\Delta X/\Delta t$ of the collision danger level X and the threshold value Kxa have a relationship $Kxa \leq \Delta X/\Delta t$, the control device changing the first threshold value Kpr of the proximity Pr to a second threshold value Kpr', which is lower than the first threshold value Kpr, and actuating the warning device under conditions that the collision danger level X and the threshold value Kx have a relationship $Kx \leq X$ and the proximity Pr and the second threshold value Kpr' have a relationship $Kpr' \leq Pr$.

In a collision prevention system according to an embodiment of the technology, when the change amount $\Delta X/\Delta t$ of the collision danger level X is greater, the threshold value of the proximity Pr is changed to the second threshold value Kpr', which is lower than the first threshold value Kpr, and the condition for performing a warning operation is determined using the second threshold value Kpr'. This allows for a warning toward the following vehicle to be issued at an early stage, giving the driver of the following vehicle more time to react. This provides an advantage that a collision of the following vehicle into the host vehicle is more effectively prevented.

BRIEF DESCRIPTION OF DRAWINGS

FIGS. 7A and 7B are explanatory diagrams illustrating a modified example of the collision prevention system illustrated in FIG. 2.

DETAILED DESCRIPTION

Embodiments of the present technology are described in detail below with reference to the drawings. However, the present technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to those skilled in the art.

Collision Prevention System

Figure 1:
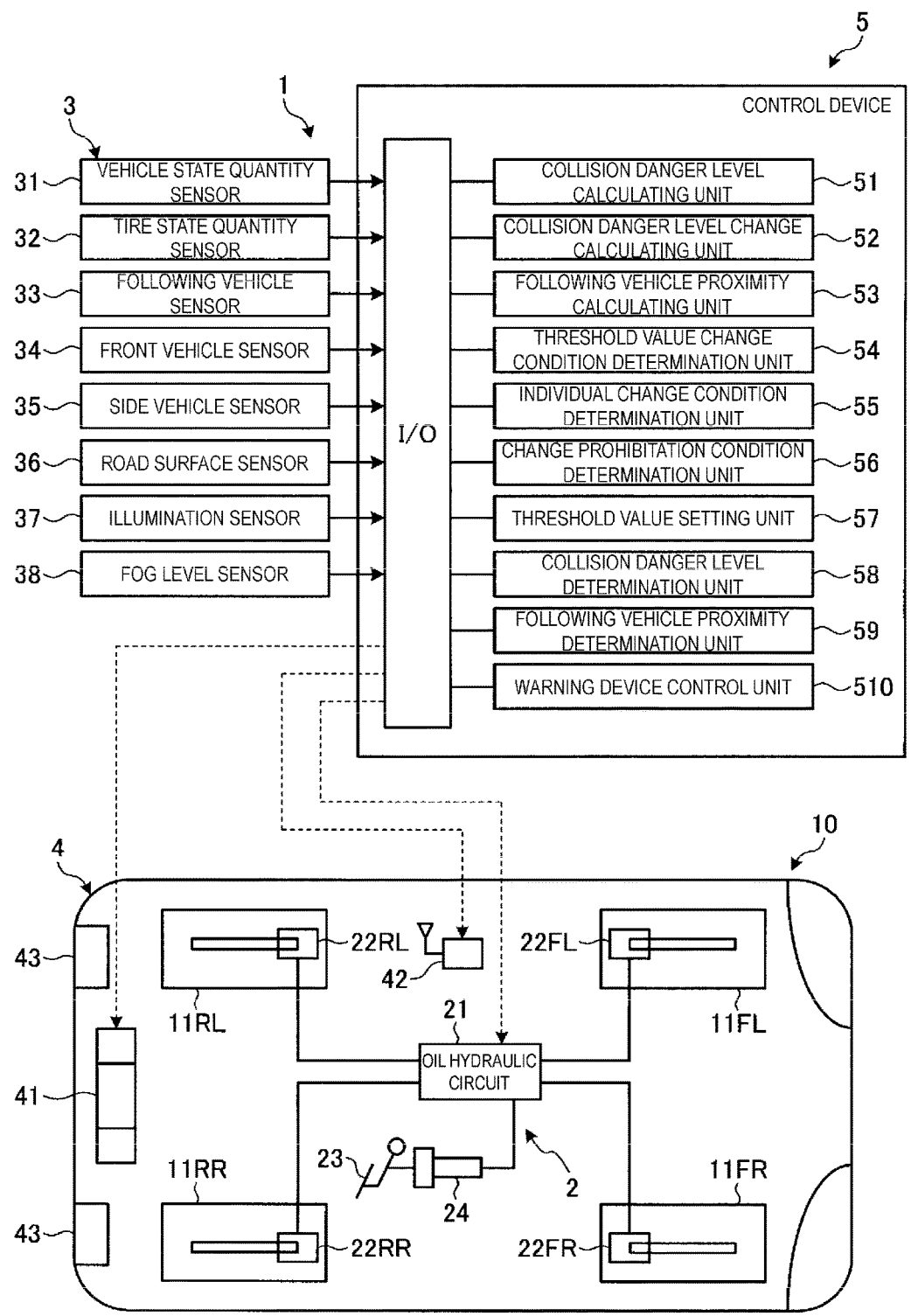
FIG. 1 is a configuration diagram illustrating a collision prevention system according to an embodiment of the technology.

FIG. 1 is a configuration diagram illustrating a collision prevention system according to an embodiment of the technology. The same drawing schematically illustrates the configuration of the collision prevention system installed in a vehicle (host vehicle 10).

The collision prevention system 1 is a system configured to issue a warning to a following vehicle 20 under a predetermined condition when the following vehicle 20 (see FIGS. 4A and 4B) approaches the host vehicle 10 to gain the attention of the driver of the following vehicle 20, and to prevent a following vehicle 20 from colliding into the host vehicle 10. The collision prevention system 1 may be mainly applied to vehicles such as passenger vehicle, trucks, and buses that travel on typical paved roads. Herein, an embodiment in which the host vehicle 10 is a four-wheel automobile installed with an antilock brake system (ABS) will be described.

Note that the following vehicle is a vehicle traveling on the road behind the host vehicle in the same lane and may include a four-wheeled vehicle or a two-wheeled vehicle. Additionally, the following vehicle is not limited to a vehicle traveling directly behind the host vehicle, and may include a vehicle traveling behind the vehicle following the host vehicle. For example, by issuing a warning to the vehicle following directly behind the host vehicle and the following vehicle or vehicles traveling further behind, collisions involving the following vehicles, i.e. multiple-vehicle accidents can be prevented.

The host vehicle 10 includes a braking device 2, a sensor unit 3, a warning device 4, and a control device 5 (see FIG. 1).

The braking device 2 is a device configured to control wheels 11FR to 11RL (left front wheel 11FL, right front wheel 11FR, left rear wheel 11RL, right rear wheel 11RR) in terms of braking force, and includes an oil hydraulic circuit 21, wheel cylinders 22FR to 22RL, a brake pedal 23, and a master cylinder 24. The oil hydraulic circuit 21 is constituted by a reservoir, an oil pump, an oil hydraulic holding valve, an oil hydraulic reducing valve, and the like (not illustrated).

The sensor unit 3 is provided with various sensors for acquiring predetermined information that affects the behavior of the host vehicle 10. The sensors are categorized into host vehicle sensors, surrounding vehicle sensors, and surrounding environment sensors.

Host vehicle sensors are sensors configured to acquire information that directly affects the behavior of the host vehicle 10 and, in particular, include a vehicle state quantity sensor 31 configured to acquire a vehicle state quantity of the host vehicle 10, and a tire state quantity sensor 32 configured to acquire the tire state quantity of each tire mounted on the host vehicle 10.

The vehicle state quantity sensor 31 may include, for example, a wheel speed sensor configured to detect the wheel speed of each of the wheels 11FR to 11RL, a vehicle body speed sensor configured to detect a vehicle body speed of the host vehicle 10, a longitudinal acceleration sensor configured to detect longitudinal acceleration of the host vehicle 10, a lateral acceleration sensor configured to detect lateral acceleration of the host vehicle 10, a yaw rate sensor configured to detect a yaw rate of the host vehicle 10, a steering angle sensor configured to detect a steering angle of the host vehicle 10, an accelerator position sensor configured to detect an accelerator position of the host vehicle 10, a braking force sensor configured to detect force applied on the brake pedal 23 of the host vehicle 10, a throttle valve position sensor configured to detect a throttle valve position, and the like.

The tire state quantity sensor 32 may include, for example, a strain sensor configured to measure an amount of tire strain attached at predetermined positions of the tires mounted on the wheels 11FR to 11RL, a vibration sensor configured to measure a vibration level of the tire, a sound pressure sensor configured to measure sound pressure levels of the tire interior, an air pressure sensor configured to measure air pressure of the tire, and the like.

A surrounding vehicle sensor is a sensor configured to acquire information relating to the surrounding vehicles traveling near the host vehicle 10 (for example, a following vehicle, a vehicle in front, or a vehicle to the side). For example, tailgating by the following vehicle, sudden braking by the vehicle in front, cutting in by the vehicle to the side, and the like greatly affect the behavior of the host vehicle 10. The surrounding vehicle sensor includes a following vehicle sensor 33 configured to acquire information of the following vehicle described above, a front vehicle sensor 34 configured to acquire information of the vehicle traveling on the road in front of the host vehicle in the same lane, and a side vehicle sensor 35 configured to acquire information of the vehicle to the side of the host vehicle traveling on the road in the lane adjacent to the host vehicle. As the surrounding vehicle sensors 33 to 35, an inter-vehicle distance sensor or a relative velocity sensor configured to measure the inter-vehicle distance or the relative velocity of the host vehicle 10 and the surrounding vehicles can be applied. Such inter-vehicle distance sensors and relative velocity sensors, for example, are constituted by a millimeter-wave radar, an infrared radar, a doppler radar, and the like, and are configured to emit a sensor signal from the host vehicle 10 toward the surrounding vehicle, receive a reflection wave from the surrounding vehicle, and output a signal in response to the inter-vehicle distance or relative velocity between the host vehicle 10 and the surrounding vehicle. Additionally, as the surrounding vehicle sensor, an image sensor configured to acquire image information of the surrounding vehicle may be applied. Such image sensors are installed on the host vehicle 10 and are configured to image the surrounding vehicle and output image data of the surrounding vehicle. By performing image processing on this image data, the behavior of the surrounding vehicle and the proximity of the surrounding vehicle to the host vehicle 10 can be analyzed.

A surrounding environment sensor is a sensor configured to acquire information relating to the surrounding environment of the host vehicle 10. The surrounding environment sensor may include, for example, a road surface sensor 36 configured to measure the road surface state (for example, a dry index Dr of the road surface) of the road on which the host vehicle 10 is traveling, an illumination sensor 37 configured to measure the illuminance level L of the road on which the host vehicle 10 is traveling, a fog level sensor 38 configured to measure a fog level F of the road on which the host vehicle 10 is traveling, and the like. As these sensors, known sensors can be applied. Such road surface states, illuminance levels L, fog levels F, and the like greatly affect the behavior of the host vehicle 10.

The warning device 4 is a device configured to issue a warning from the host vehicle 10 toward the following vehicle 20. As the warning device 4, for example, a lamp unit 41 (see FIG. 1) installed at a position visible from the following vehicle 20 (for example, a rear portion of the host vehicle 10), a speaker unit (not illustrated) configured to output sound behind the host vehicle 10, a display unit (not illustrated) installed at a position visible from the following vehicle 20 configured to a display alphanumerics, a pattern, a signal, or the like can be applied. Such a lamp unit 41 or a speaker unit issues a warning from the host vehicle 10 toward the following vehicle 20 by, for example, the lamp unit 41 lighting up in a warning-like manner, the speaker unit outputting a warning-like sound output, and the display unit displaying predetermined warning information.

Additionally, as the warning device 4, a vehicle-to-vehicle communication unit configured to enable communication between vehicles, i.e. the host vehicle 10 and the following vehicle 20 can be applied. The vehicle-to-vehicle communication unit may be constituted by a communication unit 42 (see FIG. 1) installed in the host vehicle 10, and a communication unit 201 (see FIGS. 4A and 4B described below) installed in the following vehicle 20. In the collision prevention system 1, the communication unit 42 of the host vehicle 10 mainly functions as a transmitter, and the communication unit 201 of the following vehicle 20 mainly functions as a receiver. The communication unit 42 of the host vehicle 10 transmits predetermined information relating to the warning to the communication unit 201 of the following vehicle 20 to give a warning from the host vehicle 10 toward the following vehicle 20. Note that the communication unit 201 of the following vehicle 20 may be a dedicated vehicle-to-vehicle communication unit installed in the following vehicle 20, or, for example, may be a personal data assistant placed in the following vehicle 20 (for example, a smart phone or tablet with a vehicle-to-vehicle communication application installed).

Additionally, the warning device 4 may be an existing lamp unit installed in the host vehicle 10. As such a lamp unit, for example, a rear combination lamp 43 mounted on the left and right rear portion of the host vehicle 10 can be applied. The rear combination lamp may include a stop lamp, a tail lamp, a turn-signal lamp, a back lamp, and the like. In the rear combination lamp 43, for example, the left and right rear portion rear combination lamps may simultaneously flash to give a warning from the host vehicle 10 toward the following vehicle 20.

The control device 5, for example, is an Electrical Control Unit (ECU) configured to comprehensively control the operations of the braking device 2 and the warning device 4 on the basis of output signals of the sensor unit 3. The control device 5, for example, is provided with a Central Processing Unit (CPU), Read-Only Memory (ROM), Random-Access Memory (RAM), and the like, and is further provided with a storage unit (not illustrated) configured to store predetermined information (a control program, a control map, threshold values, setting values, and the like). Additionally, the control device 5 includes a collision danger level calculating unit 51, a collision danger level change calculating unit 52, a following vehicle proximity calculating unit 53, a threshold value change condition determination unit 54, an individual change condition determination unit 55, a change prohibition condition determination unit 56, a threshold value setting unit 57, a collision danger level determination unit 58, a following vehicle proximity determination unit 59, and a warning device control unit 510. Specifically, the CPU of the control device 5 reads and executes various control programs from the storage unit to enable these functions.

Prevention of Collision of Following Vehicle into Host Vehicle

In typical vehicle braking, when the driver of the host vehicle 10 pushes down of the brake pedal 23, the amount of pushed-down pressure transmits to the oil hydraulic circuit 21 via the master cylinder 24. Depending on the amount of pushed-down pressure of the brake pedal 23, the oil hydraulic circuit 21 adjusts the fluid pressure of the wheel cylinders 22FR to 22RL. In this way, the wheel cylinders 22FR to 22RL are driven, and braking force is applied to the wheels 11FR to 11RL. Additionally, pushing down on the brake pedal 23 lights up the brake lamp of the rear combination lamp 43. As a result, the host vehicle 10 braking is informed to the driver of the following vehicle 20, the attention of the driver of the following vehicle 20 is gained, and thus a collision of the following vehicle 20 into the host vehicle 10 is prevented.

However, despite the foregoing, when the host vehicle 10 suddenly brakes or in conditions with bad visibility, a possibility of a collision of the following vehicle 20 into the host vehicle 10 tends to increase.

Hence, the collision prevention system 1 issues a warning from the host vehicle 10 toward the following vehicle 20, under a predetermined condition, when the inter-vehicle distance between the host vehicle 10 and the following vehicle 20 is short, when the following vehicle 20 rapidly approaches the host vehicle 10, or the like. Accordingly, the attention of the driver of the following vehicle 20 is gained, allowing the driver of the following vehicle 20 to take suitable action such as ensuring a sufficient inter-vehicle distance to the host vehicle 10. As a result, a collision of the following vehicle 20 into the host vehicle 10 is prevented. Specific actions of the collision prevention system 1 will be described below.

Figure 2:
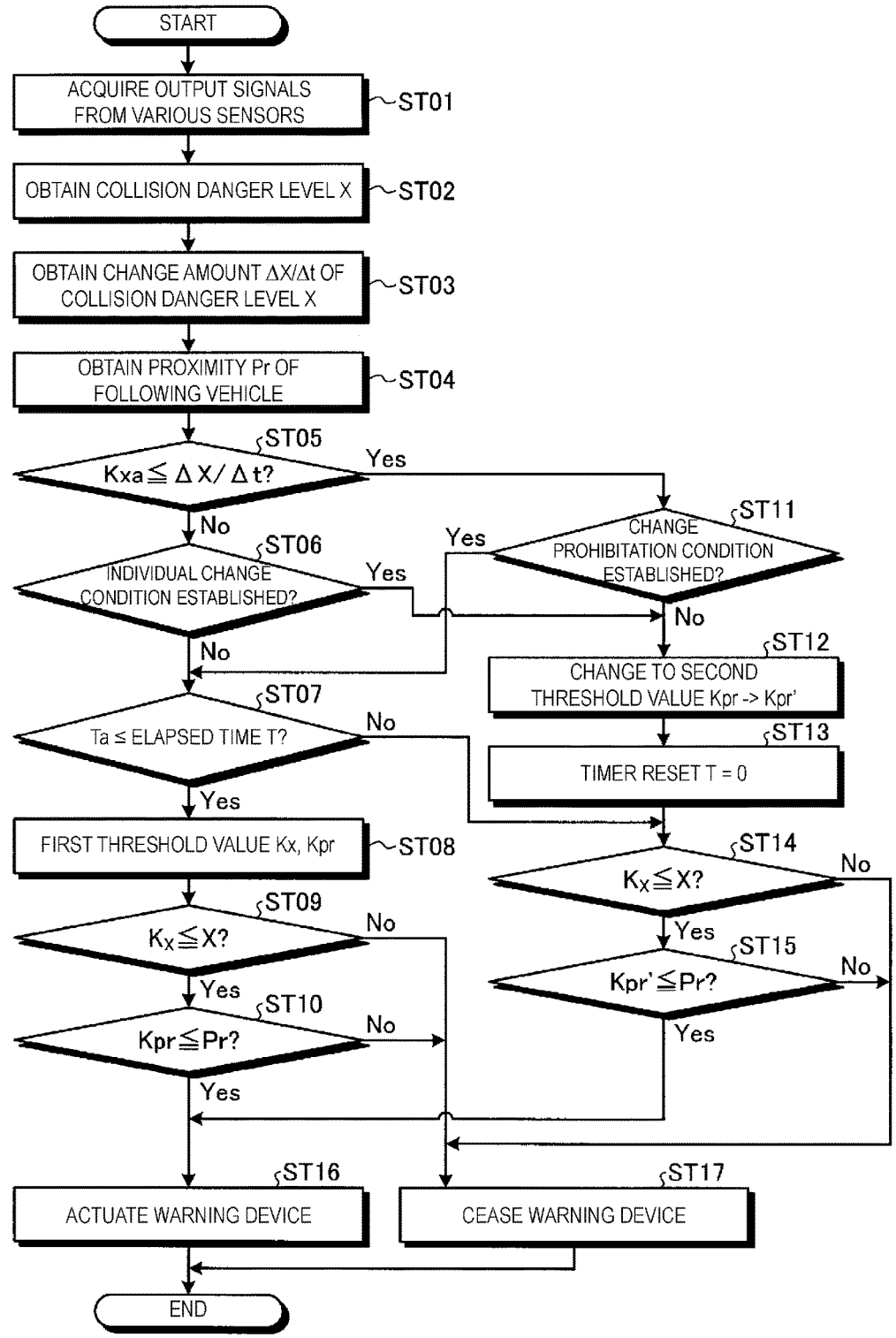
FIG. 2 is a flowchart illustrating actions of the collision prevention system illustrated in FIG. 1.

FIG. 2 is a flowchart illustrating actions of the collision prevention system illustrated in FIG. 1. The actions of the collision prevention system 1 will be described below following the flowchart of FIG. 2.

In step ST01, the control device 5 acquires output signals from the various sensors 31 to 38 of the sensor unit 3. In other words, when the host vehicle 10 is traveling, the various sensors 31 to 38 measure the information relating to a vehicle state quantity and a tire state quantity of the host vehicle 10, the information relating to the surrounding vehicle (for example, the following vehicle, the vehicle in front, and the vehicle to the side) of the host vehicle 10, and the information relating to the road surface state of the road on which the host vehicle 10 is traveling and the surround environment (for example, illuminance level and fog level) within a predetermined sampling period. The control device 5 acquires in real time the output signals from the various sensors 31 to 38. After step ST01, the process moves to step ST02.

In step ST02, the collision danger level calculating unit 51 of the control device 5 obtains a collision danger level X on the basis of the output signals of the various sensors 31 to 38. The collision danger level X is an index value, and larger values indicate an increased possibility of the following vehicle 20 colliding into the host vehicle 10 due to the behavior of the host vehicle 10. Examples of behavior of the host vehicle 10 that affect the possibility of a collision by the following vehicle 20 may include, for example, sudden braking of the host vehicle 10, sudden deceleration, sudden turning, slipping, and the like. The collision danger level X is obtained using a predetermined calculation formula including parameters that affect the behavior of the host vehicle 10. Specific examples of the collision danger level X are described below. After step ST02, the process moves to step ST03.

In step ST03, the collision danger level change calculating unit 52 of the control device 5 obtains a change amount $\Delta X/\Delta t$ of the collision danger level X on the basis of the output signals of the various sensors 31 to 38. The change amount $\Delta X/\Delta t$ is defined as the change amount of the collision danger level $\Delta X$ in a predetermined sampling period $\Delta t$. Larger values for the change amount $\Delta X/\Delta t$ indicate an increased collision danger level X and that the travel state of the host vehicle 10 is suddenly changing. Thus, in such a travel state, compared to when the value of the change amount $\Delta X/\Delta t$ is small, it can b e said that there is an increased possibility of the following vehicle 20 colliding into the host vehicle 10. After step ST03, the process moves to step ST04.

In step ST04, the following vehicle proximity calculating unit 53 of the control device 5 obtains a proximity Pr of the following vehicle 20 to the host vehicle 10. The proximity Pr is a value corresponding to the inter-vehicle distance or the relative velocity between the host vehicle 10 and the following vehicle 20. Larger values mean a shorter inter-vehicle distance between the host vehicle 10 and the following vehicle 20 or a faster approach speed of the following vehicle 20 to the host vehicle 10. For example, in a case in which the following vehicle sensor 33 is an inter-vehicle distance sensor or a relative velocity sensor, the following vehicle proximity calculating unit 53 of the control device 5 converts the output signal from the sensors and obtains the proximity Pr of the following vehicle 20. Additionally, in a case in which the following vehicle sensor 33 is an image sensor configured to image behind the host vehicle 10, the control device 5 image processes the output signal from the image sensor, extracts image information relating the following vehicle 20, and compares the image information of the following vehicle 20 across a plurality of sampling time slices to obtain the proximity Pr of the following vehicle 20. After step ST04, the process moves to step ST05.

In step ST05, the threshold value change condition determination unit 54 of the control device 5 determines whether the change amount $\Delta X/\Delta t$ of the collision danger level X and a predetermined threshold value Kxa have a relationship $Kxa \leq \Delta X/\Delta t$. When $Kxa \leq \Delta X/\Delta t$ is satisfied, this indicates an increased collision danger level X and that the travel state of the host vehicle 10 is suddenly changing. When $\Delta X/\Delta t \leq Kxa$ is satisfied, this indicates a stable collision danger level X and that the travel state of the host vehicle 10 has little change. Thus, when $Kxa \leq \Delta X/\Delta t$ is satisfied, compared to when $\Delta X/\Delta t \leq Kxa$ is satisfied, it can be said that there is an increased possibility of the following vehicle 20 colliding into the host vehicle 10. In a case where a positive determination is made in step ST05, the process moves to step ST11, but in a case where a negative determination is made, the process moves to step ST06.

In step ST06, the individual change condition determination unit 55 of the control device 5 determines whether a predetermined individual change condition is established. The individual change condition specifies a condition in which the setting of the threshold value of the proximity Pr is lowered (step ST12 described below) even when the change amount $\Delta X/\Delta t$ of the collision danger level X is smaller (negative determination in step ST05). Additionally, the individual change condition may be defined to include at least one parameter of the collision danger level X, or may be defined to be distinct from the collision danger level X. Specific examples of the individual change condition are described below. In a case where a positive determination is made in step ST06, the process moves to step ST12, but in a case where a negative determination is made, the process moves to step ST07.

In step ST07, the threshold value change condition determination unit 54 of the control device 5 determines whether an elapsed time T from the last time the previous threshold value is changed (step ST12 and ST13 described below) and a predetermined threshold value Ta have the relationship $Ta \leq T$. The threshold value Ta is defined as the period of time, in which it is preferable to maintain the changed threshold value setting (step ST12). In a case where a positive determination is made in step ST07, the process moves to step ST14, but in a case where a negative determination is made, the process moves to step ST08.

In step ST08, the threshold value setting unit 57 of the control device 5 sets predetermined first threshold values Kx, Kpr. Additionally, in a case where a second threshold value Kpr' is set in step ST12 described below, the second threshold value Kpr' is returned to the first threshold value Kpr, i.e., the initial value. The first threshold values Kx, Kpr are used in determining the collision danger level X described below and the proximity Pr of the following vehicle 20 (steps ST09 and ST10). After step ST08, the process moves to step ST09.

In step ST09, the collision danger level determination unit 58 of the control device 5 determines whether the collision danger level X and the first threshold value Kx have a relationship $Kx \leq X$. When $Kx \leq X$ is satisfied, the collision danger level X is high and it can be said that there is an increased possibility of the following vehicle 20 colliding into the host vehicle 10. In a case where a positive determination is made in step ST09, the process moves to step ST10, but in a case where a negative determination is made, the process moves to step ST17.

In step ST10, the following vehicle proximity determination unit 59 of the control device 5 determines whether the proximity Pr of the following vehicle 20 and the first threshold value Kpr have a relationship $Kpr \leq Pr$. When $Kpr \leq Pr$ is satisfied, the inter-vehicle distance between the host vehicle 10 and the following vehicle 20 is short or the approach speed of the following vehicle 20 to the host vehicle 10 is fast, thus it can be said that there is an increased possibility of the following vehicle 20 colliding into the host vehicle 10. In a case where a positive determination is made in step ST10, the process moves to step ST16, but in a case where a negative determination is made, the process moves to step ST17.

In step ST11, the change prohibition condition determination unit 56 of the control device 5 determines whether a predetermined change prohibition condition is established. The change prohibition condition specifies a condition in which the threshold value of the proximity Pr of the following vehicle 20 is preferably not changed (step ST12 described below) even when the change amount $\Delta X/\Delta t$ of the collision danger level X is greater (positive determination in step ST05). Specific examples of the change prohibition condition are described below. In a case where a positive determination is made in step ST11, the process moves to step ST07, but in a case where a negative determination is made, the process moves to step ST12.

In step ST12, the threshold value setting unit 57 of the control device 5 changes the first threshold value Kpr of the proximity Pr to the predetermined second threshold value Kpr'. The second threshold value Kpr', compared to the first threshold value Kpr, i.e., the initial value, is set such that a warning toward the following vehicle 20 described below is more readily issued. Specifically, the second threshold value Kpr' of the proximity Pr is set lower than the first threshold value Kpr. After step ST12, the process moves to step ST13.

In step ST13, the threshold value setting unit 57 of the control device 5 resets a time T of a timer. The value T indicates the elapsed time T from when the threshold value is changed (step ST12). After step ST13, the process moves to step ST14.

In step ST14, the collision danger level determination unit 58 of the control device 5 determines whether the collision danger level X and the first threshold value Kx have the relationship $Kx \leq X$. When $Kx \leq X$ is satisfied, the collision danger level X is high and it can be said that there is an increased possibility of the following vehicle 20 colliding into the host vehicle 10. In a case where a positive determination is made in step ST14, the process moves to step ST15, but in a case where a negative determination is made, the process moves to step ST17.

In step ST15, the following vehicle proximity determination unit 59 of the control device 5 determines whether the proximity Pr of the following vehicle 20 and the changed second threshold value Kpr' have a relationship $Kpr' \leq Pr$. As described above, the second threshold value Kpr' is set lower than the first threshold value Kpr, i.e., the initial value, ($Kpr' \leq Kpr$) and set such that a warning toward the following vehicle 20 described below is more prone to be issued. Thus, the determination condition used for the second threshold value Kpr' (Kpr'≤Pr) is more readily established than the determination condition used for the first threshold value Kpr (Kpr≤Pr of step ST10). In a case where a positive determination is made in step ST15, the process moves to step ST16, but in a case where a negative determination is made, the process moves to step ST17.

In step ST16, the warning device control unit 510 of the control device 5 actuates the warning device 4. As a result, a warning is issued from the host vehicle 10 toward the following vehicle 20, the attention of the driver of the following vehicle 20 is gained, and a collision of the following vehicle 20 into the host vehicle 10 is prevented before it happens. After step ST16, the process returns to step ST01.

In step ST17, the warning device control unit 510 of the control device 5 ceases the operation of the warning device 4. In this way, the warning from the host vehicle 10 toward the following vehicle 20 ceases, and an initial state is returned to. After step ST17, the process returns to step ST01.

When the collision danger level X reaches the predetermined threshold value while the vehicle is traveling, usually the behavior of the host vehicle 10 becomes unstable and thus there is an increased possibility of a collision of the following vehicle 20 into the host vehicle 10. Here, as part of the basic action of the collision prevention system 1, the warning device 4 is driven in response to the proximity Pr of the following vehicle 20 having exceeded the predetermined threshold value, and a warning from the host vehicle 10 toward the following vehicle 20 is issued. As a result, the attention of the driver of the following vehicle 20 is gained, and a collision by the following vehicle 20 is prevented before it happens.

Here, when the change amount $\Delta X/\Delta t$ of the collision danger level X is smaller ($\Delta X/\Delta t < Kxa$: negative determination in step ST05), the travel state of the host vehicle 10 has little change and the collision danger level X increases smoothly. In such a case, the driver of the following vehicle 20 has time to recognize the rise in the collision danger level X and can drive with sufficient care so as not to collide into the host vehicle 10. In such a case, the operation condition of the warning device 4 is determined by using the first threshold values Kx, Kpr at the initial setting (steps ST09 and ST10).

When the change amount $\Delta X/\Delta t$ of the collision danger level X is greater ($Kxa \leq \Delta X/\Delta t$: positive determination in step ST05), the change in the travel state of the host vehicle 10 is great, and there is a possibility that the collision danger level X will suddenly rise and exceed the threshold value in a short period of time. Thus, the awareness of the collision danger level of the driver of the following vehicle 20 cannot keep up with the changes. Even in a case where a warning is issued from the host vehicle 10 toward the following vehicle 20, the driver of the following vehicle 20 may not be able to react in time. Accordingly, in such a case, the threshold value of the proximity Pr is changed to the second threshold value Kpr', which is lower than the first threshold value Kpr (step ST12), and the condition for performing a warning operation is determined using the second threshold value Kpr' (steps ST14 and ST15). This allows for a warning toward the following vehicle 20 to be issued at an early stage, giving the driver of the following vehicle 20 more time to react. As a result, a collision of the following vehicle 20 into the host vehicle 10 is more effectively prevented.

Note that in the configuration described above, when either the condition of the collision danger level X being lower (negative determination in step ST09 and negative determination in step ST14) or the condition of the proximity Pr of the following vehicle 20 being lower (negative determination in step ST10 and negative determination in step ST15) is established, the warning device 4 ceases (step ST17), and the warning from the host vehicle 10 toward the following vehicle 20 stops. As a result, false issuing of a warning from the host vehicle 10 toward the following vehicle 20 is prevented, and doubt and annoyance felt by the driver of the following vehicle 20 is reduced.

Specific Examples of Collision Danger Level Setting

Figure 3:
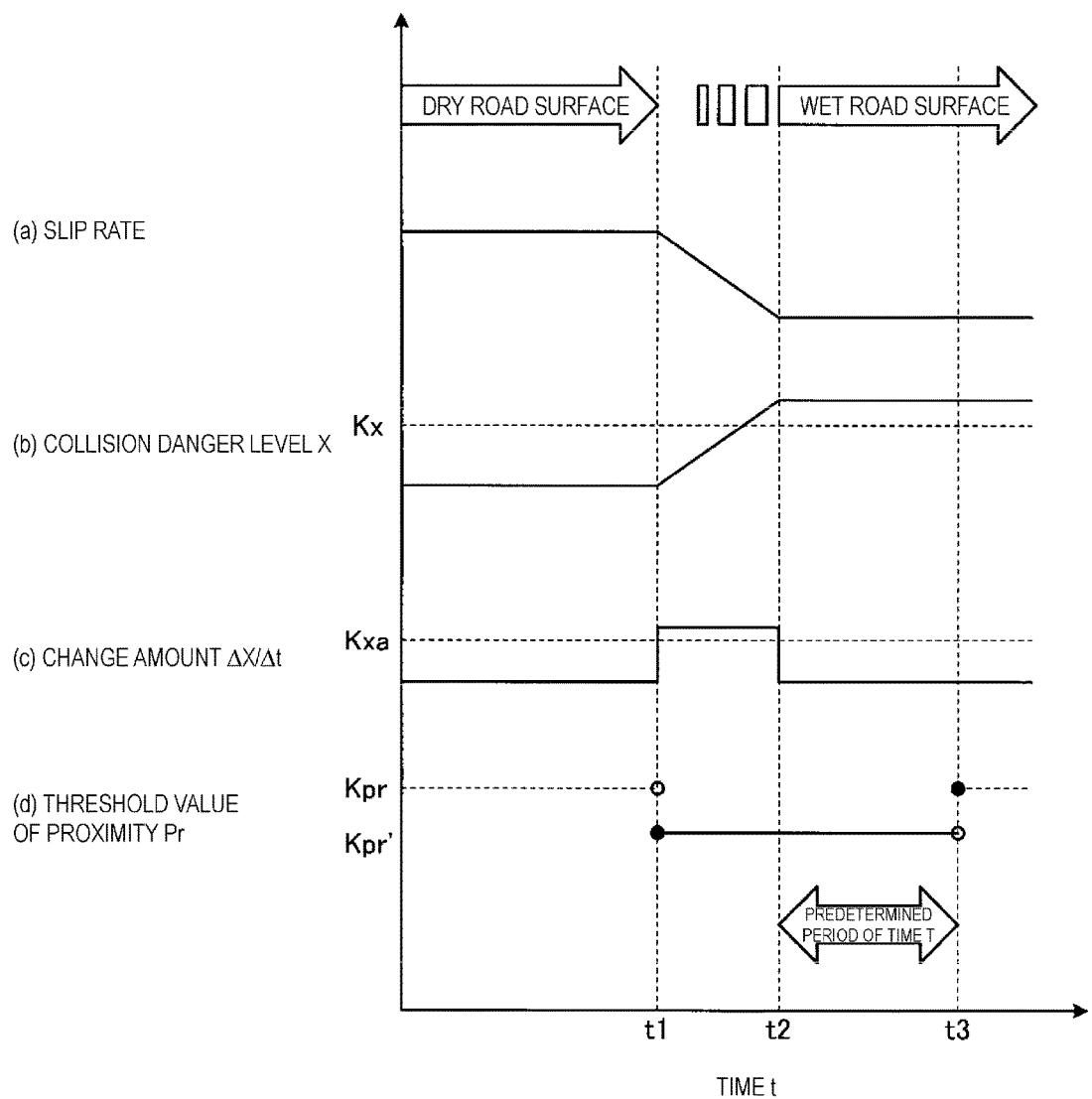
FIG. 3 is an explanatory diagram illustrating the actions of the collision prevention system illustrated in FIG. 1.
Figure 4A:
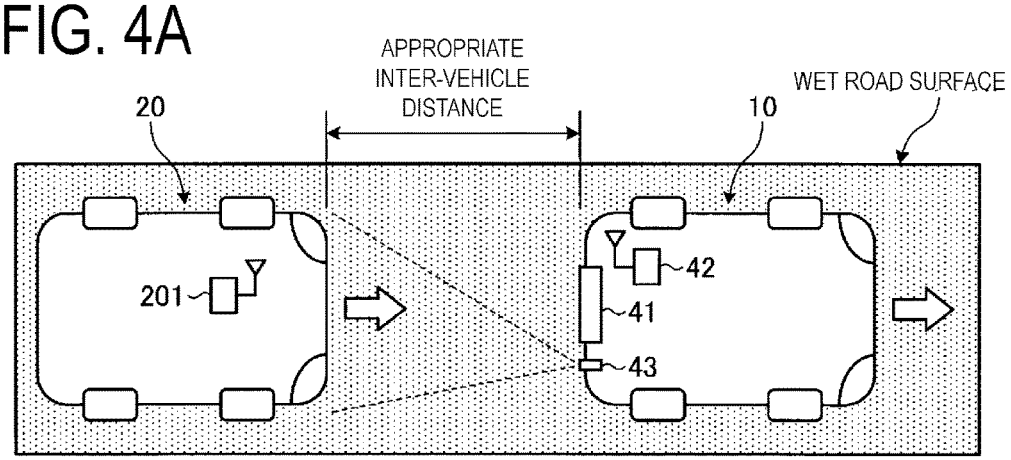
FIGS. 4A and 4B are explanatory diagrams illustrating the actions of the collision prevention system illustrated in FIG. 1.
Figure 4B:
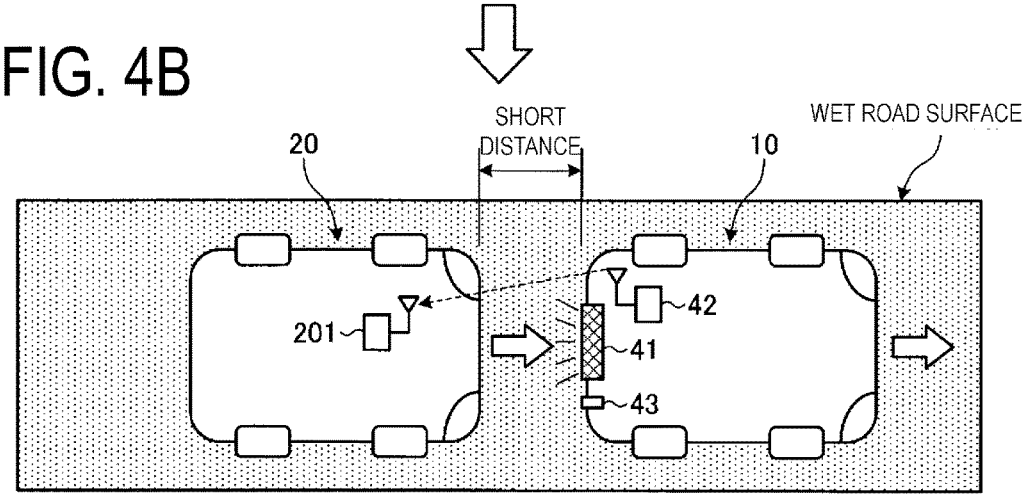
Figure 5A:
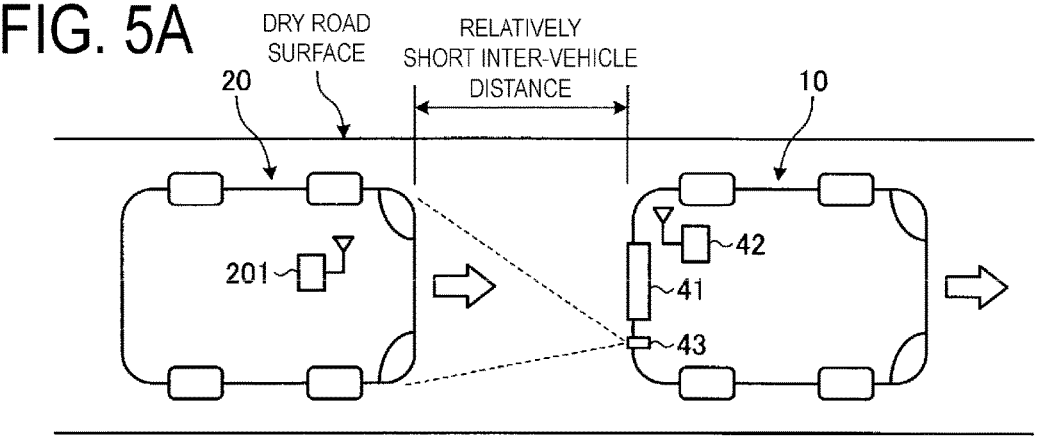
FIGS. 5A and 5B are explanatory diagrams illustrating the actions of the collision prevention system illustrated in FIG. 1.
Figure 5B:
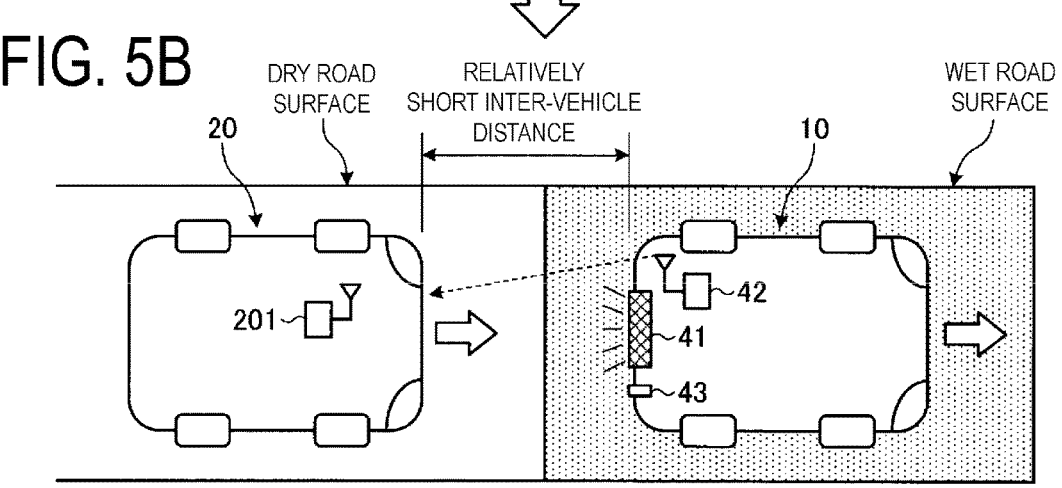

FIGS. 3 to 5B are explanatory diagrams illustrating the actions of the collision prevention system illustrated in FIG. 1. In those drawings, FIG. 3 illustrates a timing chart for when a slip rate is used as a parameter for the collision danger level X. FIGS. 4A and 4B illustrate a typical warning operation. FIGS. 5A and 5B illustrate when the warning operation is performed at an early stage.

When the vehicle is traveling, the road surface state of the road on which the host vehicle 10 is traveling may suddenly change. For example, when traveling at high speeds on the autobahn, for example, weather and temperature conditions may be different in different sections, causing the road surface conditions of the road to suddenly change. Additionally, passing through tunnels and sudden changes in weather conditions may also cause the road surface state of the road to suddenly change. In such cases, the collision danger level X may suddenly rise and the traveling condition of the host vehicle may suddenly being unstable. Accordingly, a warning is preferably issued to the following vehicle 20 at an early stage.

As illustrated in FIG. 3, consider an example of the road surface on which the host vehicle 10 is traveling suddenly changing from a dry road surface to a wet road surface. Additionally, the collision danger level X has a parameter of at least one of a slip rate of the wheel(s) of the host vehicle 10, an estimated value of a road surface friction coefficient of the road, and an index representing the road surface state of the road (for example, a dry index or a wet index). The example described herein uses the slip rate as a parameter for the collision danger level X.

The slip rate of the wheels is typically defined as a slip rate $S=(Vv-Vw)/Vv$, where Vv is a vehicle body speed and Vw is a wheel speed. Thus, for example, the slip rate can be easily obtained from the output signals from the wheel speed sensor configured to measure the wheel speed of the wheels 11FR to 11RL and the vehicle body speed sensor configured to measure the vehicle body speed of the host vehicle 10. As the slip rate of the wheels increases, the behavior of the host vehicle 10 is unstable. Thus, the collision danger level X tends to increase.

The estimated value of the road surface friction coefficient can be optionally selected using known estimate logic within a range of known to one skilled in the art. For example, the estimated value of the road surface friction coefficient can be obtained from the slip rate of the wheel(s) described above. Typically, larger values for the slip rate indicate lower road surface friction coefficients. Such technology is known from the technology described, for example, in JP 2004-25907 A. As the road surface friction coefficient increases, the behavior of the host vehicle 10 is unstable. Thus, the collision danger level X tends to increase.

The index representing the road surface state of the road can be defined, for example, as an index representing the dryness of the dry road surface, an index representing the wetness of the wet road surface, or the like. Additionally, the index representing the road surface state can be defined using a reflection intensity value acquired by, for example, irradiating the road surface with a laser beam to scan the road surface, and acquiring the reflection intensity values corresponding to the points where the laser beam irradiates the road. Such technology is known from the technology described, for example, in WO 2014189059. As the dryness of the road surface decreases and the wetness increases, the behavior of the host vehicle 10 is unstable. Thus, the collision danger level X tends to increase.

As illustrated in (a) and (b) of FIG. 3, when the road on which the host vehicle 10 is traveling changes from a dry road surface to a wet road surface, the slip rate decreases and the collision danger level X increases. The road surface state becomes a fully wet road surface, the collision danger level X increases sufficiently, the threshold value Kx exceeds, and thus the behavior of the host vehicle 10 is unstable. Here, a warning toward the following vehicle 20 is issued in response to the proximity Pr of the following vehicle 20 having exceeded the predetermined threshold value. Accordingly, the attention of the driver of the following vehicle 20 is gained, and a collision by the following vehicle 20 into the host vehicle 10 is prevented.

When the road surface state changes smoothly, for example, when the weather gradually deteriorates and the slip rate smoothly decreases, the collision danger level X smoothly increases and the change amount $\Delta X/\Delta t$ of the collision danger level X is smaller ($\Delta X/\Delta t < Kxa$: negative determination in step ST05). In such a case, the driver of the following vehicle 20 has time to recognize that the road surface conditions are getting worse, but can drive with sufficient care so as not to collide into the host vehicle 10. In such a case, the operation condition of the warning device 4 is determined using the first threshold values Kx, Kpr at the initial setting (steps ST09 and ST10).

When the vehicle is traveling, the road surface state may suddenly change from a dry road surface to a wet road surface. Examples can include a case where entering a rainy region while traveling at high speeds on the autobahn, a case where a squall brings rain during traveling, a case where the vehicle exits a tunnel and it is raining, and the like. In such cases, the slip rate suddenly increases, and the collision danger level X may exceed the threshold value in a short period of time. As illustrated in (b) and (c) of FIG. 3, specifically, the collision danger level X suddenly increases in the transition period (t=t1 to t2) from the dry road surface to the wet road surface. Additionally, the change amount $\Delta X/\Delta t$ of the collision danger level X suddenly changes. Thus, the awareness of the collision danger level of the driver of the following vehicle 20 cannot keep up with the changes, and even in a case where a warning is issued from the host vehicle 10 toward the following vehicle 20, the driver of the following vehicle 20 may not be able to react in time.

As illustrated in (c) and (d) of FIG. 3, when the change amount $\Delta X/\Delta t$ of the collision danger level X is greater ($Kxa \leq \Delta X/\Delta t$: positive determination in step ST05), under a predetermined condition, the threshold value of the proximity Pr of the following vehicle 20 is changed (step ST12) to the second threshold value Kpr', which is lower than the first threshold value Kpr. Here, the condition for performing a warning operation is determined using the second threshold value Kpr' (steps ST14 and ST15). As a result, a warning toward the following vehicle 20 is issued at an early stage, and a collision of the following vehicle 20 into the host vehicle 10 is more effectively prevented. Additionally, the setting of the second threshold value Kpr' is maintained until the predetermined elapsed time Ta from the last time the second threshold value Kpr' is changed (t=t2 to t3) (steps ST07 and ST13). This prevents hunting in the warning caused by switching between determination conditions.

As illustrated in FIG. 4A, when the road surface state of the road is a wet road surface from the start or when the road surface state smoothly changes to a wet road surface, the change amount $\Delta X/\Delta t$ of the collision danger level X is smaller ($Kxa \leq \Delta X/\Delta t$: negative determination in step ST05), and the driver of the following vehicle 20 has time to recognize the danger of a collision into the host vehicle 10. Thus, the driver of the following vehicle 20 can voluntarily take an appropriate inter-vehicle distance from the host vehicle 10. On such wet road surfaces, the slip rate is high, and thus the collision danger level X is higher ($Kx \leq X$: positive determination in step ST09), however the inter-vehicle distance of the following vehicle 20 is appropriate (negative determination in step ST10), thus the warning device 4 ceases (step ST17). Specifically, the lamp unit 41 of the warning device 4 goes out, and the communication unit 42 of the vehicle-to-vehicle communication unit ceases transmission of the warning information.

Thereafter, as illustrated in FIG. 4B, when the inter-vehicle distance of the following vehicle 20 decreases due to sudden breaking of the host vehicle 10 or the like ($Kpr \leq Pr$: positive determination in step ST10), under the condition that the collision danger level X is still higher ($Kx \leq X$: positive determination in step ST09), a warning is issued toward the following vehicle 20 (step ST16). Specifically, the lamp unit 41, i.e., the warning device 4, lights up. Additionally, the communication unit 42 of the vehicle-to-vehicle communication unit transmits predetermined warning information toward the following vehicle 20, the communication unit 201 of the following vehicle 20 receives warning information from the host vehicle 10, and the driver of the following vehicle 20 is informed. These operations invite the attention of the driver of the following vehicle 20, and a collision by the following vehicle 20 is prevented before it happens.

In the state illustrated in FIG. 5A, the road surface state of the road is a continuous dry road surface. Thus, the following vehicle 20 travels behind the host vehicle 10 with a slightly shorter inter-vehicle distance than an appropriate inter-vehicle distance on wet road surfaces (see FIG. 4A). Additionally, on such dry road surfaces, the slip rate is lower, thus the collision danger level X is lower ($X < Kx$: negative determination in step ST09) and the change amount $\Delta X/\Delta t$ of the collision danger level X is lower ($Kxa \leq \Delta X/\Delta t$: negative determination in step ST05). Additionally, because the threshold value of the inter-vehicle distance (the proximity Pr) is not reached ($Pr < Kpr$: negative determination in step ST10), the warning device 4 is ceased (step ST17).

Thereafter, as illustrated in FIG. 5B, when the road surface state suddenly changes from a dry road surface to a wet road surface, the change amount $\Delta X/\Delta t$ of the collision danger level X increases ($Kxa \leq \Delta X/\Delta t$: positive determination in step ST05) and the collision danger level X exceeds the threshold value ($Kx \leq X$: positive determination in step ST14) in a short period of time. In this state, the behavior of the host vehicle 10 is susceptible to becoming unstable. Thus, in normal cases, the following vehicle 20 preferably can make the inter-vehicle distance from the host vehicle 10 more appropriate (see FIG. 4A). However, when the road surface state suddenly changes, the driver of the following vehicle 20 is prone to be late in recognizing the collision danger level X, and despite the sudden increase in the collision danger level X, continues to drive with the same shorter inter-vehicle distance (see FIG. 5A) as when driving the following vehicle 20 on dry road surfaces. In such a state, even in a case where the host vehicle 10 suddenly brakes and the inter-vehicle distance is reduced and the host vehicle 10 issues a warning toward the following vehicle 20 (see FIG. 4B), the inter-vehicle distance may basically be insufficient to allow the driver of the following vehicle 20 to suitably react. Here, as described above, when the change amount $\Delta X/\Delta t$ of the collision danger level X is greater (Kxa≤$\Delta X/\Delta t$: positive determination in step ST05), the threshold value of the proximity Pr of the following vehicle 20 is changed (step ST12) to the lower second threshold value Kpr', and the condition for performing a warning operation is determined using the second threshold value Kpr' (steps ST14 and ST15). Then, as illustrated in FIG. 5B, compared to the state of FIG. 4B, even with the proximity Pr being low, a warning is issued toward the following vehicle 20 (step ST16). As a result, a warning toward the following vehicle 20 is issued at an early stage, and the attention of the driver of the following vehicle 20 can be appropriately prompted.

Obtaining the change amount $\Delta X/\Delta t$ of the collision danger level X has a purpose of detecting a sudden change in the collision danger level X over a short period of time or in an irregular manner caused by a change in the road surface state as described above. Conceptually speaking, assuming that conditions in which the driver of the following vehicle 20 is unable to immediately adjust the inter-vehicle distance to the host vehicle 10 in response to a sudden change of the collision danger level X. Thus, for example, the change in the collision danger level X is not inclusive of changes that happen everyday or over a long span such as changes of the road surface conditions from day to night or changes of the road surface conditions caused by the aging of tires. From this perspective, the sampling period $\Delta t$ is appropriately set to a short period of time of seconds or tens of seconds.

Note that in the configurations of FIGS. 3 to 5B, as described above, the collision danger level X has a parameter of at least one of the slip rate of the wheels of the host vehicle 10, the estimated value of the road surface friction coefficient of the road, and the index representing the road surface state of the road (for example, a dry index or a wet index). In such a configuration, when the road surface on which the host vehicle 10 is traveling suddenly changes from a dry road surface to a wet road surface (see FIGS. 3 to 5B), a warning can be appropriately issued toward the following vehicle 20, which is preferable.

However, no such limitation is intended, and the collision danger level X may have a parameter of at least one of illuminance level of the road on which the host vehicle 10 is traveling and the fog level in addition to or instead of the parameters described above. The illuminance level of the road and the fog level can be acquired as output signals from the illumination sensor 37 and the fog level sensor 38 (see FIG. 1). When the illuminance level of the road decreases or the fog level of the road decreases, the road becomes worse in visibility and the behavior of the host vehicle 10 is unstable. As a result, the collision danger level X tends to increase. Additionally, it becomes difficult for the driver of the following vehicle 20 to recognize the host vehicle 10 traveling in front, and thus the collision danger level X tends to increase. However, when the collision danger level X suddenly increases due to the parameters described above (Kxa≤$\Delta X/\Delta t$: positive determination in step ST05), the threshold value of the determination condition of the warning operation is preferably lowered (step ST12) and a warning toward the following vehicle 20 is preferably issued (step ST16) at an early stage.

Additionally, the collision danger level X may have a parameter of proximity of the host vehicle to a vehicle traveling in front (not illustrated) in addition to or instead of the parameters described above. The proximity to the vehicle in front is defined as the inter-vehicle distance or the relative velocity between the host vehicle 10 and the vehicle in front. Additionally, the inter-vehicle distance and the relative velocity to the vehicle in front can be acquired as an output signal from the front vehicle sensor 34 (see FIG. 1). For example, in conditions in which the host vehicle 10 is rapidly approaching the vehicle in front due to sudden deceleration of the vehicle in front or sudden acceleration of the host vehicle 10, the behavior of the host vehicle 10 is unstable, and thus the collision danger level X tends to increase. Examples include a case where the driver of the host vehicle 10 suddenly brakes to ensure the inter-vehicle distance with the vehicle in front, and a case where the collision prevention system of the host vehicle 10 associated with the vehicle in front (not illustrated) automatically controls the braking device 2 to suddenly break the host vehicle 10. However, when the collision danger level X suddenly increases due to the parameters described above (Kxa≤$\Delta X/\Delta t$: positive determination in step ST05), the threshold value of the determination condition of the warning operation is preferably lowered (step ST12) and a warning toward the following vehicle 20 is preferably issued (step ST16) at an early stage.

Specific Examples of Individual Change Condition

As described above, in the configuration of FIG. 2, when the predetermined individual change condition is established (positive determination in step ST06), even when the change amount $\Delta X/\Delta t$ of the collision danger level X is smaller (negative determination in step ST05), the threshold value of the proximity Pr of the following vehicle 20 is changed (step ST12) to the lower second threshold value Kpr', and the condition for performing a warning operation is determined (steps ST14 and ST15). In other words, the individual change condition specifies a condition in which a warning is issued toward the following vehicle 20 at an early stage even when the collision danger level X is smoothly changing. This allows a warning toward the following vehicle 20 to be further appropriately issued.

As such an individual change condition, for example, a tailgating determination condition for determining whether the behavior of the following vehicle 20 corresponds to tailgating of the host vehicle 10 can be applied. The tailgating determination condition is defined in consideration of, for example, (a) cases in which the condition of the travel speed V of the host vehicle 10 being high and the inter-vehicle distance between the host vehicle 10 and the following vehicle 20 being short continues for a predetermined period of time, (b) the following vehicle 20 is weaving left and right while following the host vehicle 10 with a short inter-vehicle distance, and the like. To detect such tailgating, discretionary known technology can be applied. For example, (a) described above can be easily obtained by measuring the duration the predetermined traveling condition of the travel speed V of the host vehicle 10 and the inter-vehicle distance to the following vehicle 20. Additionally (b) described above can be easily obtained by imaging the following vehicle 20 with a camera installed on the host vehicle 10, image processing the image, and extracting and obtaining the behavioral pattern of the following vehicle 20. When there is a high possibility that the following vehicle 20 is tailgating the host vehicle 10, even when the change amount $\Delta X/\Delta t$ of the collision danger level X is smaller ($\Delta X/\Delta t \leq Kxa$: negative determination in step ST05), the threshold value of the determination condition for the warning operation is preferably lowered (step ST12) and a warning (step ST16) toward the following vehicle 20 is preferably issued at an early stage. This can promote the tailgating following vehicle 20 to make the inter-vehicle distance appropriate.

Additionally, as the individual determination condition, a front vehicle behavior determination condition for determining whether the behavior of the vehicle (not illustrated) traveling in front of the host vehicle 10 is unstable can be applied, in addition to or instead of the individual determination condition described above. The instability of the behavior of the vehicle in front can be detected, for example, by determining whether the behavior of the vehicle in front corresponds to a predetermined pattern of weaving driving by image processing the image data acquired by the front vehicle sensor 34 (see FIG. 1), which is a camera configured to image the vehicle in front, and extracting the behavior of the vehicle in front. In a case where the behavior of the vehicle in front is unstable, the host vehicle 10 may suddenly brake in response to the behavior of the vehicle in front. Thus, even when the change amount $\Delta X/\Delta t$ of the collision danger level X is smaller ($\Delta X/\Delta t \leq Kxa$: negative determination in step ST05), the threshold value of the determination condition for the warning operation is preferably lowered (step ST12) and a warning (step ST16) toward the following vehicle 20 is preferably issued at an early stage. As a result, the following vehicle 20 can be prompted to make the inter-vehicle distance appropriate.

Additionally, as the individual determination condition, a side vehicle cut-in determination condition for determining whether the possibility of the vehicle traveling to the side (not illustrated) of the host vehicle 10 in the lane adjacent to the host vehicle 10 cutting in is high can be applied in addition to or instead of the individual determination condition described above. Cutting-in by the vehicle to the side can be detected by determining whether the behavior of the vehicle to the side corresponds to a predetermined pattern such as having a winker blinking indicating lane change or approach or pulling close to the lane of the host vehicle 10, by extracting the behavior of the vehicle to the side from an output signal from the side vehicle sensor 35 (see FIG. 1), which is a camera configured to image the vehicle to the side or a sensor configured to measure the relative distance or relative velocity between the host vehicle 10 and the vehicle to the side. When the vehicle to the side cuts in front of the host vehicle 10, the host vehicle 10 may suddenly brake in response to the behavior of the vehicle to the side. Thus, even when the change amount $\Delta X/\Delta t$ of the collision danger level X is smaller ($\Delta X/\Delta t < Kxa$: negative determination in step ST05), the threshold value of the determination condition for the warning operation is preferably lowered (step ST12) and a warning (step ST16) toward the following vehicle 20 is preferably issued at an early stage. As a result, the following vehicle 20 can be prompted to make the inter-vehicle distance appropriate.

Additionally, as the individual determination condition, a tire abnormality determination condition for determining whether there is an abnormality in the tire state quantity of the host vehicle can be applied in addition to or instead of the individual determination condition described above. The tire abnormality determination is performed by detecting an abnormality in the tire temperature or tire air pressure on the basis of output signals from the tire state quantity sensor 32 (see FIG. 1). Additionally, as the system configured to detect such a tire abnormality during vehicle travel, a known tire state monitoring system can be applied. When an abnormality is found in the tire state quantity, there is a high possibility that the behavior of the host vehicle 10 is unstable. Thus, even when the change amount $\Delta X/\Delta t$ of the collision danger level X is smaller ($\Delta X/\Delta t < Kxa$: negative determination in step ST05), the threshold value of the determination condition for the warning operation is preferably lowered (step ST12) and a warning (step ST16) toward the following vehicle 20 is preferably issued at an early stage. As a result, the following vehicle 20 can be prompted to make the inter-vehicle distance appropriate.

Additionally, as the individual determination condition, an ABS determination condition for determining whether the ABS control of the host vehicle 10 is active can be applied in addition to or instead of the individual determination condition described above. When the ABS control of the host vehicle 10 is active, the slip rate of the road is high and the road is slippery. Thus, there is a high possibility that the behavior of the host vehicle 10 is unstable. Thus, even when the change amount $\Delta X/\Delta t$ of the collision danger level X is smaller ($\Delta X/\Delta t < Kxa$: negative determination in step ST05), the threshold value of the determination condition for the warning operation is preferably lowered (step ST12) and a warning (step ST16) toward the following vehicle 20 is preferably issued at an early stage. As a result, the following vehicle 20 can be prompted to make the inter-vehicle distance appropriate.

The ABS control is executed as follows. First, when the vehicle is traveling, the control device 5 obtains an estimated value μ of the road surface friction coefficient of the road R on the basis of the output signal from the sensor unit 3. Additionally, the control device 5 obtains the slip rate of the wheels on the basis of the output signal from the sensor unit 3. In a case where the slip rate exceeds a predetermined threshold value, the ABS control is activated and the ABS control ON lamp lights up. In the ABS control, the control device 5 selects the control mode of the wheels 11FR to 11RL on the basis of the estimated value μ of the road surface friction coefficient. The control mode is a control mode of the braking pressure (braking force) associated with the wheels 11FR to 11RL. The control mode is chosen from one of reduce pressure, maintain pressure, and increase pressure. The control device 5 drives the oil hydraulic circuit 21 of the braking device 2 and reduces, maintains, or increases the fluid pressure of the wheel cylinders 22FR to 22RL on the basis of the control mode. Specifically, the control device 5 maintains the slip rate S within a predetermined range such that the road surface friction coefficient reaches maximum. As a result, the braking pressure of the wheels 11FR to 11RL are controlled, and the host vehicle 10 is prevented from spinning, drifting over, wheel slipping, and the like. For example, when the vehicle body decelerates after the host vehicle 10 suddenly brakes, the braking force increases before the load sufficiently shifts to the wheels 11FR to 11RL, making the wheels 11FR to 11RL vulnerable to locking. Here, the ABS control activates, and the control device 5 reduces the fluid pressure of the wheel cylinders 22FR to 22RL. This helps prevent the wheels 11FR to 11RL from locking, and ensures the braking force of the host vehicle 10.

Note that examples of when the ABS control is not active include before or after the ABS control is active, when the ABS control is stopped by a request from the vehicle side of the control device 5, and the like.

Additionally, as the individual determination condition, a road surface determination condition for determining whether the road surface state of the road on which the host vehicle 10 is traveling is a wet road surface or a snowy road surface can be applied in addition to or instead of the individual determination condition described above. When the road surface is a wet road surface or a snowy road surfaces, the slip rate of the road is high and the road is slippery. Thus, there is a high possibility that the behavior of the host vehicle 10 is unstable. Thus, even when the change amount $\Delta X/\Delta t$ of the collision danger level X is smaller ($\Delta X/\Delta t < Kxa$: negative determination in step ST05), the threshold value of the determination condition for the warning operation is preferably lowered (step ST12) and a warning (step ST16) toward the following vehicle 20 is preferably issued at an early stage. As a result, the following vehicle 20 can be prompted to make the inter-vehicle distance appropriate. Specific Examples of Change Prohibition Condition As described above, in the configuration of FIG. 2, when the predetermined change prohibition condition is established (positive determination in step ST11), even when the change amount $\Delta X/\Delta t$ of the collision danger level X is greater (positive determination in step ST05), the threshold value of the proximity Pr of the following vehicle 20 is set (step ST08) to the first threshold value Kpr, i.e., the initial value, and the condition for performing a warning operation is determined (steps ST09 and ST10). In other words, the change prohibition condition specifies a condition in which the threshold value of the condition for performing the warning operation toward the following vehicle 20 is not changed even when the collision danger level X is suddenly changing. This allows a warning toward the following vehicle 20 to be further appropriately issued.

As the change prohibition condition, a traffic congestion determination condition indicating that the host vehicle 10 is stuck in traffic congestion can be applied. When the host vehicle 10 is stuck in traffic congestion, the proximity Pr of the following vehicle 20 is maintained at a high value. Thus, when the threshold value of the determination condition for the warning operation is lowered, false warnings toward the following vehicle 20 may be performed, and annoyance may be felt by the driver of the following vehicle 20. In such a case, the threshold value of the determination condition of the warning operation is stopped from being lowered (step ST12). This allows a warning toward the following vehicle 20 to be appropriately issued.

As described above, in the configuration of FIG. 2, when the change prohibition condition is established (positive determination in step ST11), the threshold value of the proximity Pr of the following vehicle 20 is set (step ST08) to the first threshold value Kpr, i.e., the initial value, and the condition for performing a warning operation is determined (steps ST09 and ST10).

However, no such limitation is intended, and when the change prohibition condition is established, the threshold value of the proximity Pr may be changed to a third threshold value higher than the first threshold value Kpr, i.e., the initial value, and the condition for performing a warning operation may be determined. This allows a warning toward the following vehicle 20 to be further appropriately issued in traffic congestion.

Warning Levels

Figure 6:
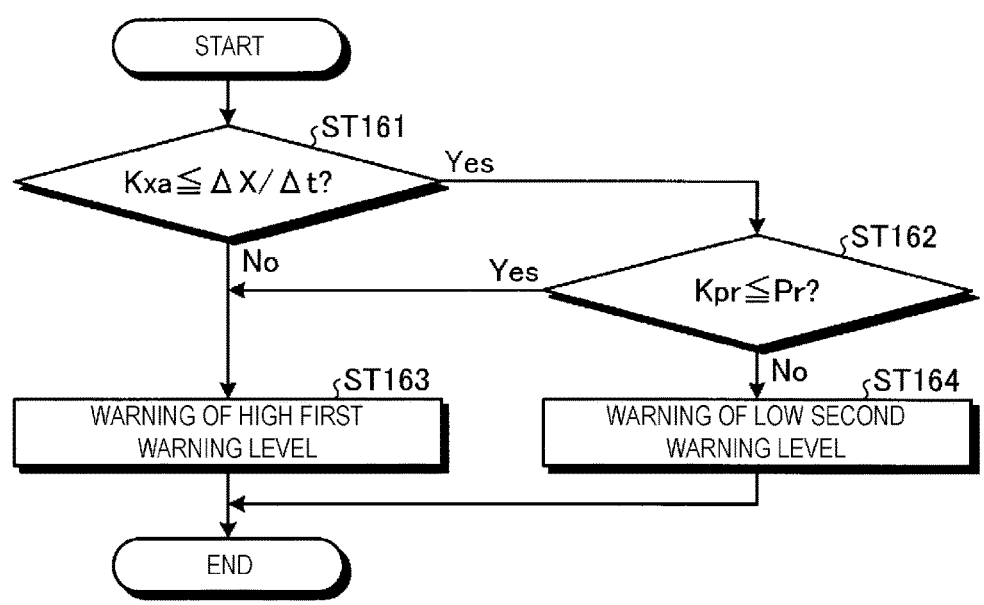
FIG. 6 is an explanatory diagram illustrating a modified example of the collision prevention system illustrated in FIG. 2.

FIGS. 6, 7A, and 7B are explanatory diagrams illustrating modified examples of the collision prevention system illustrated in FIG. 2. These drawings illustrate a flowchart (FIG. 6) and explanatory diagrams (FIGS. 7A and 7B) of the warning levels depending on the change amount $\Delta X/\Delta t$ of the collision danger level X.

In the configuration of FIGS. 4 and 5, the warning device 4 is the lamp unit 41, and the lamp unit 41 issues a warning toward the following vehicle 20 by going from a state of being off (FIGS. 4A and 5A) to being on (FIGS. 4B and 5B). Additionally, the lamp unit 41 is operable in only one type of lit up state, and as illustrated in FIGS. 4B and 5B, the entire of the light-up portion of the lamp unit 41 lights up.

In the configuration of FIG. 6, a warning toward the following vehicle 20 has levels depending on the change amount $\Delta X/\Delta t$ of the collision danger level X. In other words, each time the warning device 4 activates, the control device 5 determines whether the change amount $\Delta X/\Delta t$ of the collision danger level X and the predetermined threshold value Kxa have the relationship $Kxa \leq \Delta X/\Delta t$ (step ST161). Then, in a case where $\Delta X/\Delta t < Kxa$ is satisfied (negative determination in step ST161), the warning device 4 issues a warning of the first warning level with a high warning level (step ST163). In a case where $Kxa \leq \Delta X/\Delta t$ is satisfied (positive determination in step ST161), the control device 5 determines whether the proximity Pr of the following vehicle 20 and the first threshold value Kpr have the relationship $Kpr \leq Pr$ (step ST162). Then, in a case where $Kpr \leq Pr$ is satisfied (positive determination in step ST162), the warning device 4 issues a warning of the first warning level with a high warning level (step ST163), and in a case where $Pr < Kpr$ is satisfied (negative determination in step ST162), the warning device 4 issues a warning of a second warning level with a lower warning level than the first warning level (step ST164).

The warning levels described above are enabled by the warning device 4 including a warning level device (not illustrated) configured to issue warnings on a plurality of warning levels. As such a warning level device, for example, a configuration can be applied in which the warning device 4 serves as the lamp unit 41 configured to issue a warning via a light up operation or a flashing operation, and the light-up portion thereof such that the area or luminance increases in levels, or the shape or flashing rate changes in levels. Additionally, for example, a configuration can be applied in which the warning device 4 serves as a speaker unit configured to issue a warning via a sound output, and the contents of the sound change in levels. Additionally, for example, a configuration can be applied in which the warning device 4 serves as a display unit configured to issue a warning via a warning display, and the contents of the display change in levels. Additionally, a configuration can be applied in which the warning device 4 serves as the communication unit 42 of the vehicle-to-vehicle communication unit configured to transmit warning information toward the following vehicle 20, and the warning information transmitted to the following vehicle 20 changes in levels. Additionally, for example, a configuration can be applied in which the warning device 4 serves as a left and right rear portion turn-signal lamp configured to issue a warning via a flashing operation, and the flashing rate changes in levels.

For example, as illustrated in FIG. 2, when the change amount $\Delta X/\Delta t$ is smaller ($\Delta X/\Delta t < Kxa$: negative determination in step ST05), as illustrated in FIG. 7A, the operation condition of the warning device 4 is determined (step ST09) using the relatively high first threshold value Kpr (step ST08). Accordingly, in a situation in which a warning is issued, the proximity Pr of the following vehicle 20 is high. In this case, a warning of the first warning level with a high warning level is issued as usual (step ST163). Specifically, the warning device 4 performs a warning operation of lighting up all of the light-up portion or flashing the light-up portion. This invites the attention of the driver of the following vehicle 20 as appropriate.

As illustrated in FIG. 2, when the change amount ΔX/Δt is greater (Kxa≤ΔX/Δt: positive determination in step ST05), as illustrated in FIG. 7B, the operation condition of the warning device 4 is determined (step ST15) using the relatively low second threshold value Kpr' (step ST12). Accordingly, a warning is issued even when the proximity Pr of the following vehicle 20 is relatively low. In this case, when the proximity Pr does not satisfy the first threshold value Kpr (Pr<Kpr: negative determination in step ST162), a warning of the second warning level with a low warning level is issued (step ST164). In other words, when the proximity Pr is greater (Kpr≤Pr), a warning of the first warning level with a usual higher warning level is issued (step ST163) (see FIG. 7A), and when the proximity Pr is relatively smaller (Kpr'≤Pr<Kpr), a warning of the second warning level with a lower warning level is issued (step ST164). Specifically, the warning device 4 operates at the second warning level to light up a portion of the light-up portion or the light-up portion flashes. In such a configuration, the low second threshold value Kpr' is used to reduce annoyance felt by the driver of the following vehicle 20 caused by a warning being readily issued. This allows a warning toward the following vehicle 20 to be appropriately issued.

Changing Threshold Value of Collision Danger Level

Figure 8:
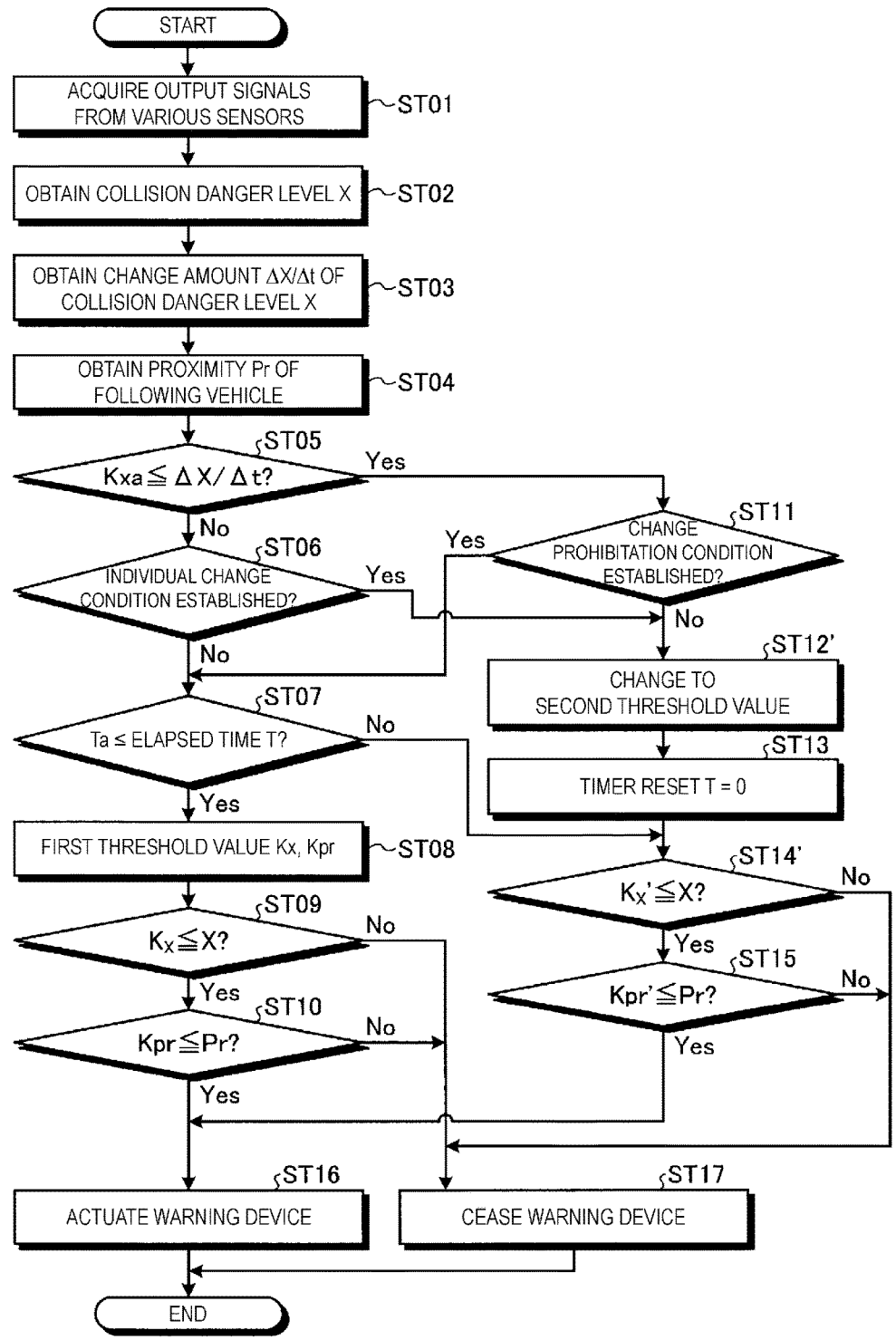
FIG. 8 is an explanatory diagram illustrating a modified example of the collision prevention system illustrated in FIG. 2.

FIG. 8 is an explanatory diagram illustrating a modified example of the collision prevention system illustrated in FIG. 2. The same drawing illustrates a flowchart for when the threshold value of the collision danger level X is changed as well as the threshold value of the proximity Pr.

In the configuration of FIG. 2, regardless of the magnitude of the change amount ΔX/Δt of the collision danger level X (the determination result of step ST05), the collision danger level X is compared to the certain threshold value Kx to determine the condition for performing a warning operation (steps ST09 and ST14).

In contrast, in the configuration of FIG. 8, when the change amount ΔX/Δt of the collision danger level X is greater (Kxa≤ΔX/Δt: positive determination in step ST05), the threshold value Kx of the collision danger level X is changed (step ST12') to a lower second threshold value Kx', and the condition for performing a warning operation is determined using the second threshold value Kx' (step ST14'). In such a configuration, while the collision danger level X is increasing, a warning is issued toward the following vehicle 20 when the collision danger level X is relatively low (Kx'≤X: positive determination in step ST14'). As a result, a warning toward the following vehicle 20 can be issued (step ST16) at an early stage, and a collision of the following vehicle 20 into the host vehicle 10 is more effectively prevented.

Effects

As described above, the collision prevention system 1 prevents a collision of the following vehicle 20 into the host vehicle 10. Additionally, the collision prevention system 1 includes the sensor unit 3 configured to acquire predetermined information that affects the behavior of the host vehicle 10, the warning device 4 configured to issue a warning toward the following vehicle 20, and the control device 5 configured to control the operation of the warning device 4 (see FIG. 1). The control device 5 is configured to define the collision danger level X such that larger values indicate an increased possibility of the following vehicle 20 colliding into the host vehicle 10 due to the behavior of the host vehicle 10, and is configured to define the proximity Pr such that larger values indicate a shorter inter-vehicle distance or greater relative velocity between the host vehicle 10 and the following vehicle 20. The control device 5 obtains (steps ST02, ST03, and ST04) the collision danger level X, the change amount ΔX/Δt of the collision danger level X, and the proximity Pr on the basis of the output signals from the sensor unit 3 (see FIG. 2). When the change amount ΔX/Δt of the collision danger level X and the predetermined threshold value Kxa have the relationship ΔX/Δt<Kxa (negative determination in step ST05), the control device 5 actuates the warning device 4 (step ST16) under the conditions that the collision danger level X and the predetermined threshold value Kx have the relationship Kx≤X (positive determination in step ST09) and the proximity Pr and the first threshold value Kpr have the relationship Kpr≤Pr (positive determination in step ST10). When the change amount ΔX/Δt of the collision danger level X and the threshold value Kxa have the relationship Kxa≤ΔX/Δt (positive determination in step ST05), the control device 5 changes the first threshold value Kpr of the proximity Pr to the lower second threshold value Kpr' (step ST12) and actuates the warning device 4 (step ST16) under the conditions that the collision danger level X and the threshold value Kx have the relationship Kx≤X (positive determination in step ST14) and the proximity Pr and the second threshold value Kpr' have the relationship Kpr'≤Pr (positive determination in step ST15).

In such a configuration, when the change amount ΔX/Δt of the collision danger level X is greater (Kxa≤ΔX/Δt: positive determination in step ST05), the threshold value of the proximity Pr is changed (step ST12) to the second threshold value Kpr', which is lower than the first threshold value Kpr, and the condition for performing a warning operation is determined using the second threshold value Kpr' (steps ST14 and ST15). Hence, a warning toward the following vehicle 20 is issued at an early stage, giving the driver of the following vehicle 20 more time to react. This provides an advantage that a collision of the following vehicle 20 into the host vehicle 10 are more effectively prevented.

In the collision prevention system 1, when the change amount ΔX/Δt of the collision danger level X and the predetermined threshold value Kxa have the relationship ΔX/Δt<Kxa (negative determination in step ST05), from when the first threshold value Kpr of the proximity Pr was last changed to the second threshold value Kpr' (step ST13) until the predetermined elapsed time Ta has past (positive determination in step ST07), the control device 5 determines the operation condition of the warning device using the post-change second threshold value Kpr' (step ST15). Such a configuration has an advantage that hunting in the warning caused by switching between determination conditions is prevented. This allows the warning device 4 to appropriately operate.

In the collision prevention system 1, the warning device 4 includes a warning level device (see FIGS. 7A and 7B) configured to issue warnings on a plurality of warning levels. When the change amount ΔX/Δt of the collision danger level X and the predetermined threshold value Kxa have the relationship ΔX/Δt<Kxa (negative determination in step ST161), the control device 5 actuates the warning device 4 at the first warning level (step ST163) (see FIGS. 6, 7A, and 7B). When the change amount $\Delta X/\Delta t$ of the collision danger level X and the threshold value Kxa have the relationship $Kxa \leq \Delta X/\Delta t$ (positive determination in step ST161), the warning device 4 is actuated (step ST164) at the second warning level with a lower warning level than the first warning level under the condition that the proximity Pr and the first threshold value Kpr have the relationship Pr<Kpr (negative determination in step ST162) (see FIG. 7B). Such a configuration can use the low second threshold value Kpr' to reduce annoyance caused by a warning being issued too often. This provides an advantage that a warning toward the following vehicle 20 is appropriately issued.

In the collision prevention system 1, when the change amount $\Delta X/\Delta t$ of the collision danger level X and the threshold value Kxa have the relationship $Kxa \leq \Delta X/\Delta t$ (positive determination in step ST05), the control device 5 changes the threshold value Kx of the collision danger level X to the lower second threshold value Kx' (step ST12') and determines the operation condition of the warning device 4 using the post-change second threshold value Kx' (step ST14') (see FIG. 8). When the collision danger level X is increasing, such a configuration can issue a warning toward the following vehicle 20 (step ST16) at an earlier stage. This provides an advantage that a collision of the following vehicle 20 into the host vehicle 10 is more effectively prevented.

In the collision prevention system 1, the collision danger level X includes as a parameter the slip rate of the wheel(s) of the host vehicle 10 or the estimated value of the road surface friction coefficient of the road on which the host vehicle 10 is traveling (see FIG. 3). This provides an advantage that the collision danger level X is appropriately set and a warning toward the following vehicle 20 can be appropriately issued.

In the collision prevention system 1, the collision danger level X includes as a parameter an index indicating the road surface state of the road on which the host vehicle 10 is traveling. This provides an advantage that the collision danger level X is appropriately set and a warning toward the following vehicle 20 can be appropriately issued.

In the collision prevention system 1, the collision danger level X includes as a parameter an illuminance level of the road on which the host vehicle 10 is traveling. This provides an advantage that the collision danger level X is appropriately set and a warning toward the following vehicle 20 can be appropriately issued.

In the collision prevention system 1, the collision danger level X includes as a parameter a fog level of the road on which the host vehicle 10 is traveling. This provides an advantage that the collision danger level X is appropriately set and a warning toward the following vehicle 20 can be appropriately issued.

In the collision prevention system 1, the collision danger level X includes as a parameter the proximity of the host vehicle 10 to a vehicle traveling in front. This provides an advantage that the collision danger level X is appropriately set and a warning toward the following vehicle 20 can be appropriately issued.

In the collision prevention system 1, even when the change amount $\Delta X/\Delta t$ of the collision danger level X and the predetermined threshold value Kxa have the relationship $\Delta X/\Delta t<Kxa$ (negative determination in step ST05), when the predetermined individual change condition is established (positive determination in step ST06), then control device 5 changes the first threshold value Kpr of the proximity Pr to the lower second threshold value Kpr' (step ST12), and determines the operation condition of the warning device 4 (step ST15). In such a configuration, even when the collision danger level X is smoothly changing, when the predetermined individual condition is established, a warning is issued toward the following vehicle 20 at an early stage. This provides an advantage that a warning toward the following vehicle 20 is more appropriately issued.

In the collision prevention system 1, the individual change condition includes a tailgating determination condition for determining whether the behavior of the following vehicle 20 corresponds to tailgating of the host vehicle 10. This provides an advantage that the individual change condition is appropriately set and a warning toward the following vehicle 20 can be appropriately issued.

In the collision prevention system 1, the individual determination condition includes a front vehicle behavior determination condition for determining whether the behavior of the vehicle traveling in front of the host vehicle 10 is unstable. This provides an advantage that the individual change condition is appropriately set and a warning toward the following vehicle 20 can be appropriately issued.

In the collision prevention system 1, the individual determination condition includes a side vehicle cut-in determination condition for determining whether the possibility of the vehicle traveling to the side of the host vehicle 10 in the lane adjacent to the host vehicle 10 cutting in is high. This provides an advantage that the individual change condition is appropriately set and a warning toward the following vehicle 20 can be appropriately issued.

In the collision prevention system 1, the individual determination condition includes a tire abnormality determination condition for determining whether there is an abnormality in the tire state quantity of the host vehicle 10. This provides an advantage that the individual change condition is appropriately set and a warning toward the following vehicle 20 can be appropriately issued.

In the collision prevention system 1, the individual determination condition includes an ABS determination condition for determining whether the ABS control of the host vehicle 10 is active. This provides an advantage that the individual change condition is appropriately set and a warning toward the following vehicle 20 can be appropriately issued.

In the collision prevention system 1, the individual determination condition includes a road surface determination condition for determining whether the road surface state of the road on which the host vehicle 10 is traveling is a wet road surface or a snowy road surface. This provides an advantage that the individual change condition is appropriately set and a warning toward the following vehicle 20 can be appropriately issued.

In the collision prevention system 1, even when the change amount $\Delta X/\Delta t$ of the collision danger level X and the predetermined threshold value Kxa have the relationship $Kxa \leq \Delta X/\Delta t$ (positive determination in step ST05), when the predetermined change prohibition condition is established (positive determination in step ST11), the control device 5 uses the first threshold value Kpr of the proximity Pr (step ST08) to determine the operation condition of the warning device 4 (step ST10). In such a configuration, even when the collision danger level X suddenly changes, when the predetermined change prohibition condition is established, the threshold value of the condition for performing a warning operation toward the following vehicle 20 is not changed. This provides an advantage that a warning toward the following vehicle 20 is more appropriately issued.

In the collision prevention system 1, the change prohibition condition includes a traffic congestion determination condition indicating that the host vehicle 10 is stuck in traffic congestion. This provides an advantage that the change prohibition condition is appropriately set and a warning toward the following vehicle 20 can be appropriately issued.

The invention claimed is:

1. A collision prevention system for preventing a collision of a following vehicle into a host vehicle, the collision prevention system comprising:
a sensor unit configured to acquire predetermined information that affects behavior of the host vehicle;
a warning device configured to issue a warning toward the following vehicle; and
a control device configured to control an operation of the warning device;
the control device
defining a collision danger level X such that a larger value indicates an increased possibility of the following vehicle colliding into the host vehicle due to the behavior of the host vehicle, and defining a proximity Pr such that a larger value indicates a shorter inter-vehicle distance or indicates a greater relative velocity between the host vehicle and the following vehicle,
calculating the collision danger level X, a change amount $\Delta X/\Delta t$ of the collision danger level X, and the proximity Pr, based on an output signal from the sensor unit,
when the change amount $\Delta X/\Delta t$ of the collision danger level X and a predetermined threshold value Kxa have a relationship $\Delta X/\Delta t<Kxa$, the control device actuating the warning device under conditions that the collision danger level X and a predetermined threshold value Kx have a relationship $Kx \leq X$ and the proximity Pr and a first threshold value Kpr have a relationship $Kpr \leq Pr$; and
when the change amount $\Delta X/\Delta t$ of the collision danger level X and the threshold value Kxa have a relationship $Kxa \leq \Delta X/\Delta t$, the control device changing the first threshold value Kpr of the proximity Pr to a second threshold value Kpr' that is lower than the first threshold value Kpr and actuating the warning device under conditions that the collision danger level X and the threshold value Kx have a relationship $Kx \leq X$ and the proximity Pr and the second threshold value Kpr' have a relationship $Kpr' \leq Pr$.

2. The collision prevention system according to claim 1, wherein when the change amount $\Delta X/\Delta t$ of the collision danger level X and the predetermined threshold value Kxa have the relationship $\Delta X/\Delta t<Kxa$, the control device determines an operation condition of the warning device using the second threshold value Kpr' that has been changed, from when the first threshold value Kpr of the proximity Pr is last changed to the second threshold value Kpr' until a predetermined elapsed time Ta elapses.

3. The collision prevention system according to claim 1, wherein
the warning device comprises a warning level device configured to issue the warning on a plurality of warning levels; and
when the change amount $\Delta X/\Delta t$ of the collision danger level X and the predetermined threshold value Kxa have the relationship $\Delta X/\Delta t<Kxa$, the control device actuates the warning device at a first warning level, and when the change amount $\Delta X/\Delta t$ of the collision danger level X and the threshold value Kxa have the relationship $Kxa \leq \Delta X/\Delta t$, the control device actuates the warning device at a second warning level that is lower than the first warning level under a condition that the proximity Pr and the first threshold value Kpr have a relationship $Pr<Kpr$.

4. The collision prevention system according to claim 1, wherein when the change amount $\Delta X/\Delta t$ of the collision danger level X and the threshold value Kxa have the relationship $Kxa \leq \Delta X/\Delta t$, the control device changes the threshold value Kx of the collision danger level X to a second threshold value Kx' that is lower than the threshold value Kx and determines an operation condition of the warning device using the second threshold value Kx' that has been changed.

5. The collision prevention system according to claim 1, wherein the collision danger level X includes as a parameter a slip rate of a wheel of the host vehicle or an estimated value of a road surface friction coefficient of a road on which the host vehicle is traveling.

6. The collision prevention system according to claim 1, wherein the collision danger level X includes as a parameter an index indicating a road surface state of a road on which the host vehicle is traveling.

7. The collision prevention system according to claim 1, wherein the collision danger level X includes as a parameter an illuminance level of the road on which the host vehicle is traveling.

8. The collision prevention system according to claim 1, wherein the collision danger level X includes as a parameter a fog level of a road on which the host vehicle is traveling.

9. The collision prevention system according to claim 1, wherein the collision danger level X includes as a parameter a proximity of the host vehicle to another vehicle traveling in front.

10. The collision prevention system according to claim 1, wherein when the change amount $\Delta X/\Delta t$ of the collision danger level X and the predetermined threshold value Kxa have the relationship $\Delta X/\Delta t<Kxa$ and when a predetermined individual change condition is established, the control device changes the first threshold value Kpr of the proximity Pr to the second threshold value Kpr' that is lower than the first threshold value Kpr and determines an operation condition of the warning device.

11. The collision prevention system according to claim 10, wherein the individual change condition includes a tailgating determination condition for determining whether behavior of the following vehicle corresponds to tailgating the host vehicle.

12. The collision prevention system according to claim 10, wherein the individual determination condition includes a front vehicle behavior determination condition for determining whether behavior of the another vehicle traveling in front of the host vehicle is unstable.

13. The collision prevention system according to claim 10, wherein the individual determination condition includes a side vehicle cut-in determination condition for determining whether a possibility the another vehicle traveling in a lane adjacent to a lane, in which the host vehicle is traveling, is going to cut in is high.

14. The collision prevention system according to claim 10, wherein the individual determination condition includes a tire abnormality determination condition for determining whether there is an abnormality in a tire state quantity of the host vehicle.

15. The collision prevention system according to claim 10, wherein the individual determination condition includes an ABS determination condition for determining whether ABS control of the host vehicle is active.

16. The collision prevention system according to claim 10, wherein the individual determination condition includes a road surface determination condition for determining whether a road surface state of a road on which the host vehicle is traveling is a wet road surface or a snowy road surface.

17. The collision prevention system according to claim 1, wherein when the change amount $\Delta X/\Delta t$ of the collision danger level X and the predetermined threshold value Kxa have the relationship $Kxa \leq \Delta X/\Delta t$ and when a predetermined change prohibition condition is established, the control device uses the first threshold value Kpr of the proximity Pr to determine an operation condition of the warning device.

18. The collision prevention system according to claim 17, wherein the change prohibition condition includes a traffic congestion determination condition indicating that the host vehicle is stuck in traffic congestion.

* * * * *